United States Patent
Ran et al.

(10) Patent No.: US 10,387,968 B2
(45) Date of Patent: Aug. 20, 2019

(54) METHOD TO DETERMINE ACCOUNT SIMILARITY IN AN ONLINE ACCOUNTING SYSTEM

(71) Applicant: Intuit Inc., Mountain View, CA (US)

(72) Inventors: Alexander S. Ran, Palo Alto, CA (US); Marko Rukonic, San Jose, CA (US); Christopher Lesner, Palo Alto, CA (US); Wei Wang, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 222 days.

(21) Appl. No.: 15/416,547

(22) Filed: Jan. 26, 2017

(65) Prior Publication Data

US 2018/0211330 A1 Jul. 26, 2018

(51) Int. Cl.
*G06Q 30/00* (2012.01)
*G06Q 40/00* (2012.01)
*G06F 16/22* (2019.01)

(52) U.S. Cl.
CPC ......... *G06Q 40/12* (2013.12); *G06F 16/2291* (2019.01)

(58) Field of Classification Search
CPC ............................. G06Q 30/02; G06Q 40/00
USPC ............................................ 705/35, 7.31, 30
See application file for complete search history.

(56) References Cited

U.S. PATENT DOCUMENTS

| | | |
|---|---|---|
| 7,283,999 B1 | 10/2007 | Ramesh et al. |
| 7,428,636 B1 | 9/2008 | Waldspurger et al. |
| 7,457,950 B1 | 11/2008 | Brickell et al. |
| 7,702,683 B1 | 4/2010 | Kirshenbaum |
| 7,815,106 B1 | 10/2010 | McConnell |
| 7,865,829 B1 | 1/2011 | Goldfield et al. |
| 7,890,754 B2 | 2/2011 | Waldspurger et al. |
| 8,024,660 B1 | 9/2011 | Quinn et al. |
| 8,037,145 B2 | 10/2011 | Bunker et al. |
| 8,046,298 B1 | 10/2011 | Voth et al. |
| 8,321,319 B1 | 11/2012 | Grossblatt et al. |
| 8,374,986 B2 | 2/2013 | Indeck et al. |
| 8,494,929 B1 | 7/2013 | Borgen et al. |
| 8,544,726 B1 | 10/2013 | Hahn |
| 8,571,919 B2 * | 10/2013 | Rane ................. G06F 17/30598 705/7.33 |
| 8,655,862 B1 | 2/2014 | Riley et al. |
| 8,688,557 B2 * | 4/2014 | Rose ..................... G06Q 40/06 705/36 R |

(Continued)

FOREIGN PATENT DOCUMENTS

| | | |
|---|---|---|
| JP | 5850592 | 12/2015 |
| WO | WO 2014/074075 | 5/2014 |

*Primary Examiner* — Oluseye Iwarere
(74) *Attorney, Agent, or Firm* — Hawley Troxell Ennis & Hawley LLP; Philip McKay

(57) ABSTRACT

A method and system groups user accounts in a financial management system based on the similarities of the financial transactions associated with the accounts. The financial management system receives financial transaction data related to a plurality of financial transactions of a plurality of users. Each of the financial transactions is associated with an account of a user. The financial management system generates account characteristics vector data including, for each account, an account characteristics vector based on the financial transactions associated with the account. The financial management system groups the accounts by performing grouping analysis on the account characteristics vectors.

31 Claims, 5 Drawing Sheets

(56) References Cited

U.S. PATENT DOCUMENTS

| | | |
|---|---|---|
| 8,719,120 B1 | 5/2014 | McVickar et al. |
| 8,949,371 B1 | 2/2015 | Shrowty |
| 8,977,626 B2 | 3/2015 | Hess |
| 9,047,243 B2 | 6/2015 | Taylor et al. |
| 9,305,056 B1 | 4/2016 | Gupta et al. |
| 9,348,857 B2 | 5/2016 | Glover |
| 2003/0078882 A1 | 4/2003 | Sukeda et al. |
| 2004/0225509 A1* | 11/2004 | Andre ................ G06Q 30/02 705/26.7 |
| 2005/0091151 A1 | 4/2005 | Coleman et al. |
| 2005/0120004 A1 | 6/2005 | Stata et al. |
| 2005/0268217 A1 | 12/2005 | Garrison |
| 2006/0200754 A1 | 9/2006 | Kablesh et al. |
| 2006/0294311 A1 | 12/2006 | Fu et al. |
| 2008/0027787 A1 | 1/2008 | Malsbenden et al. |
| 2008/0077488 A1* | 3/2008 | Main ................ G06O 30/02 705/14.17 |
| 2008/0086403 A1* | 4/2008 | Dilip ................ G06Q 20/10 705/35 |
| 2008/0320316 A1 | 12/2008 | Waldspurger et al. |
| 2009/0144239 A1 | 6/2009 | Bevis et al. |
| 2009/0183159 A1 | 7/2009 | Michael et al. |
| 2010/0250338 A1 | 9/2010 | Banerjee et al. |
| 2010/0306032 A1 | 12/2010 | Jolley |
| 2011/0087606 A1 | 4/2011 | Hammond et al. |
| 2011/0178841 A1* | 7/2011 | Rane ................ G06Q 30/02 705/7.31 |
| 2011/0178842 A1* | 7/2011 | Rane ................ G06F 17/30598 705/7.31 |
| 2011/0178844 A1* | 7/2011 | Rane ................ G06Q 30/02 705/7.31 |
| 2011/0178845 A1* | 7/2011 | Rane ................ G06Q 30/02 705/7.31 |
| 2011/0178847 A1* | 7/2011 | Rane ................ G06Q 30/02 705/7.31 |
| 2011/0178848 A1* | 7/2011 | Rane ................ G06Q 30/02 705/7.31 |
| 2011/0178849 A1* | 7/2011 | Rane ................ G06Q 30/02 705/7.31 |
| 2011/0208588 A1 | 8/2011 | Joa et al. |
| 2011/0246268 A1* | 10/2011 | Satyavolu ........... G06Q 30/02 705/14.4 |
| 2011/0264497 A1* | 10/2011 | Clyne ................ G06Q 20/10 705/14.17 |
| 2012/0004968 A1* | 1/2012 | Satyavolu ........... G06Q 20/387 705/14.17 |
| 2012/0053987 A1* | 3/2012 | Satyavolu .......... G06Q 30/0201 705/7.29 |
| 2012/0054049 A1 | 3/2012 | Hayes |
| 2012/0078766 A1* | 3/2012 | Rose ................ G06Q 40/00 705/35 |
| 2012/0109723 A1 | 5/2012 | Crooks et al. |
| 2012/0109749 A1 | 5/2012 | Subramanian et al. |
| 2013/0133048 A1 | 5/2013 | Wyn-Harris |
| 2013/0159449 A1 | 6/2013 | Taylor et al. |
| 2013/0232042 A1* | 9/2013 | Simpson ................ G06Q 40/02 705/30 |
| 2013/0272523 A1 | 10/2013 | McCorkindale et al. |
| 2013/0325548 A1* | 12/2013 | Kulkarni ........... G06Q 30/0201 705/7.29 |
| 2013/0325680 A1* | 12/2013 | Satyavolu .......... G06Q 30/0201 705/35 |
| 2013/0325681 A1* | 12/2013 | Somashekar ........ G06Q 40/00 705/35 |
| 2014/0041047 A1 | 2/2014 | Jaye et al. |
| 2014/0180826 A1 | 6/2014 | Boal |
| 2014/0188756 A1 | 7/2014 | Ponnavaikko et al. |
| 2014/0195395 A1 | 7/2014 | Bhakta et al. |
| 2014/0195398 A1* | 7/2014 | Rose ................ G06Q 40/00 705/35 |
| 2014/0222530 A1 | 8/2014 | Wegner et al. |
| 2014/0230053 A1 | 8/2014 | Mote et al. |
| 2014/0244457 A1 | 8/2014 | Howell et al. |
| 2015/0142624 A1 | 5/2015 | Buttonow et al. |
| 2015/0178856 A1 | 6/2015 | Flores |
| 2015/0193790 A1* | 7/2015 | Weinberger ........ G06Q 30/0202 705/7.31 |
| 2015/0205777 A1 | 7/2015 | Campanelli et al. |
| 2015/0206109 A1 | 7/2015 | Caldwell et al. |
| 2015/0324410 A1 | 11/2015 | Glover |
| 2015/0363704 A1 | 12/2015 | Yong et al. |
| 2015/0379430 A1 | 12/2015 | Dirac et al. |
| 2016/0063645 A1 | 3/2016 | Houseworth et al. |
| 2016/0217119 A1 | 7/2016 | Dakin et al. |
| 2017/0053012 A1 | 2/2017 | Levy et al. |
| 2017/0193045 A1 | 7/2017 | Young et al. |
| 2017/0316506 A1 | 11/2017 | Lesner et al. |

* cited by examiner

METHOD TO DETERMINE ACCOUNT SIMILARITY IN AN ONLINE ACCOUNTING SYSTEM

BACKGROUND

Every year millions of people, businesses, and organizations around the world use electronic financial management systems, such as electronic accounting systems, to help manage their finances. Electronic accounting systems use accounts for categorization of business transactions. Such electronic accounting systems gather data related to financial transactions of the users. The users can then sort the financial transactions into the various accounts in order to track their expenditures and revenues by category. The users can monitor many or all of their financial transactions and other financial matters from a single electronic accounting system and sort them into the various financial accounts. Such an electronic accounting system can help users save time by eliminating the need to check with several different financial institutions in order to manage their finances. However, traditional financial management systems are unable to optimize the financial management services provided to their users because the traditional financial management systems do not discern the nature and purpose of each account that the users create.

For instance, some traditional financial management systems enable users to generate and name the various accounts into which the users will sort their financial transactions. A certain user may have an account for employee travel expenses, an account for office supply expenses, an account for office furniture expenses, etc. The user may know the exact purpose of each account, but the traditional financial management system will not know the exact purpose of the accounts. While the user may be able to sort the various financial transactions into the account, the financial management system cannot adequately assist in the sorting process because the financial management system does not understand the purpose of each account.

One reason for these deficiencies is that in most cases the accounts, and the names of the accounts, are selected by the users and used differently by different users. Two users may each have an account named "Furniture". The first user may use this account for revenue related to sales of furniture. The second user may use this account for expenses related to replacing furniture. Additionally, users may use nearly infinite variations of names for accounts that all serve the same general purpose. Consequently, the financial management system cannot know the true nature of an account based only the name.

The inability of traditional financial systems to adequately understand the nature of user-created accounts results in under-utilization of the potential of electronic financial management systems. For example, traditional financial management systems cannot adequately automate the process of sorting electronic financial transactions of the users. This results in wasted time and resources for both the users and the financial management systems. Furthermore, users may decide not to use the financial management system due to the inconvenience of the manual sorting process, or, worse yet, users may abandon the traditional financial management system because the traditional financial management system often erroneously sorts financial transactions into user accounts. The unrealized potential extends beyond merely assisting with the sorting process. A financial management system that understands the nature of the users' financial accounting and business practices can offer better data management services to the users and to third-parties.

What is needed is a method and system that solves the long standing technical problem of electronic financial management systems that are not able to effectively and accurately determine the nature of their users' accounts.

SUMMARY

Embodiments of the present disclosure address some of the shortcomings associated with traditional financial management systems by providing methods and systems for grouping similar user accounts in a financial management system. Embodiments of the present disclosure generate account grouping data that identifies accounts that are similar to each other and forms groups of similar accounts based on the financial transactions that the users have assigned to the accounts. Embodiments of the present disclosure analyze financial transaction data related to large numbers of financial transactions of users and identify the merchants or vendors involved in the financial transactions. Embodiments of the present disclosure generate account characteristics vector data that includes, for each account, a respective account characteristics vector. In one embodiment, each account characteristics vector includes a plurality of data fields. In one embodiment, each data field is associated with one or more merchants. In one embodiment, each data field includes a respective data entry in the data field. In one embodiment, the data entry in a data field of an account characteristics vector is an indication of a number or proportion of financial transactions of the account that involve the merchant or merchants associated with the data field. Embodiments of the present disclosure generate account grouping data including groups of similar accounts by analyzing the account characteristics vectors of all of the accounts and identifying account characteristics vectors that are similar to each other. If two account characteristics vectors are similar to each other, then the accounts that they represent are also similar to each other. The accounts are grouped based on the similarity of the financial transactions that are assigned to them. By extension, the accounts are grouped based on the merchants that are involved in the financial transactions assigned to the accounts. The grouping of the accounts based on the financial transactions assigned to them provides a much greater knowledge and understanding of the types of the various accounts and the purposes for which the users use them. In this way, embodiments of the present disclosure provide a technical solution to the long standing technical problem of electronic financial management systems that do not adequately understand the accounts of their users. Embodiments of the present disclosure can advantageously utilize the increased understanding of user accounts to improve the effectiveness and the efficiency of financial management systems by assisting users in the sorting of the financial transactions, or even by automatically sorting new financial transactions into the accounts of the users. Additionally, embodiments of the present disclosure can utilize the account grouping data to understand which users utilize similar accounting practices.

In one embodiment, the financial management system generates the account grouping data by analyzing the account characteristics vector data with one or more grouping or clustering algorithms. The financial management system generates the account grouping data by analyzing each of the account characteristics vectors with the one or more grouping or clustering algorithms. The grouping or clustering algorithms indicate which vectors are similar to each other by grouping or clustering the vectors that are similar to each other. In one embodiment, the one or more grouping or clustering algorithms include one or more of a k-means clustering algorithm, a density-based spatial clustering of applications with noise (DBSCAN) clustering algorithm, or an affinity propagation clustering algorithm.

In one embodiment, the data value in a given data field of an account is an indication of a number, frequency, rate, or proportion of financial transactions of the account that involve the merchant associated with that data field. Thus, in one embodiment, a higher data value can indicate that more financial transactions from the account involve the one or more merchants associated with the data field.

In one embodiment, the financial management system generates the data values for the data fields of the account characteristics vector by using a term frequency inverse document frequency (TF-IDF) calculation. In a TF-IDF calculation for generating a single data value in a single data field of a single account, the financial management system counts the fraction of financial transactions assigned to that account that involve the one or more merchants associated with the data field. The financial management system then counts the total number of accounts that include a financial transaction involving the one or more merchants. The financial management system then generates the data value by multiplying the number of financial transactions from the account by the logarithm of the inverse of the total fraction of accounts that include a financial transaction with the one or more merchants associated with the data field for which the data value is being computed. The financial management system can generate data values for each data field of the account characteristics vector using the TF-IDF process.

In one embodiment, the financial management system can generate the data values for the data fields of the account characteristics vectors by taking the logarithm of the result of the TF-IDF process. Thus, the data value in a given data field of a given account vector can correspond to the logarithm of a number generated by the TF-IDF process. In one embodiment, the financial management system uses a base 2 logarithm for the calculation. Alternatively, the financial management system can use a logarithm with a base other than 2.

In one embodiment, the financial management system generates key characteristics data. In one embodiment, the financial management system analyzes the account grouping data in order to identify key characteristics of the accounts in each group. The key characteristics data corresponds to characteristics of the account characteristics vectors of a group that correlate most strongly with inclusion in the group. The key characteristics that correlate with inclusion in a group can correspond to financial transactions with particular merchants, groups of merchants, or types of merchants for which the accounts in the group include financial transactions. The accounts in a particular group may have financial transactions with particular merchants or groups of merchants at a significantly higher rate than the entire population of accounts. Thus, financial transactions with these particular merchants, groups of merchants, or types of merchants may characterize the account in a particular group.

In one embodiment, the key characteristics data can include threshold data values for certain data fields. The accounts in a group may have a significantly higher number or rate of financial transactions with certain merchants, groups of merchants, or types of merchants than do accounts outside the group. Some accounts outside a group may include financial transactions with merchants associated with the key characteristics data associated with the group. However, the characterizing factor may be that the accounts in the group have a much higher number or proportion of financial transactions with those merchants, groups of merchants, or types of merchants. Thus, the key characteristics data can include threshold data values in data fields associated with certain merchants, groups of merchants, or types of merchants. In this case, an account that has data values below the threshold data values for some or all of certain data fields may fall outside the group. Accounts that have data values above the threshold data values for some or all of the certain data fields may be included in the group.

In one embodiment, the financial management system utilizes the key characteristics data and the account grouping data to revise each other in a recursive manner. The key characteristics data may be generated based on an analysis of the initially generated account grouping data. The financial management system may then utilize the key characteristics data to generate additional or revised merchant grouping data. After the additional or revised merchant grouping data has been generated, the financial management system can again generate key characteristics data based on the new merchant grouping data. These recursive revisions may cause some accounts to be dropped from one group and to be newly included in a different group. Furthermore, as users of the financial management system generate new accounts, these accounts can be put into groups based on more accurate account grouping data and key characteristics data.

In one embodiment, merchant grouping can be performed based on merchants that appear in the same group of accounts. This can lead to a recursive process of refinement for account and merchant grouping.

In one embodiment, the financial management system associates each data field with one or more merchant identifications, such as one or more merchant strings or groups of merchant strings. When the financial management system gathers financial transaction data, the financial transaction data includes a merchant string for each financial transaction. The merchant string identifies the merchant involved in the financial transaction. The merchant string may include a data string having a name of the merchant, an address of the merchant, a general industry code of the merchant, a code representing a merchant, and other types of identifying information. Thus, when the financial management system generates the account characteristics vectors, each data field is associated with one or more merchant strings. For a given account, a financial transaction that involves a particular merchant will be counted toward the data value in the data field associated with the merchant string related to that merchant.

The disclosed embodiments provide one or more technical solutions to the technical problem of providing financial management systems with an adequate knowledge of the accounts of users by analyzing financial transactions associated with the accounts. These and other embodiments of the financial management system are discussed in further detail below.

Grouping similar user accounts in a financial management system by analyzing financial transactions associated with the accounts is a technical solution to a long standing technical problem and is not an abstract idea for at least a few reasons. First, grouping similar user accounts in a financial management system by analyzing financial transactions associated with the accounts is not an abstract idea because it is not merely an idea itself (e.g., can be performed mentally or using pen and paper). Second, grouping similar user accounts in a financial management system by analyzing financial transactions associated with the accounts is not an abstract idea because it is not a fundamental economic practice (e.g., is not merely creating a contractual relationship, hedging, mitigating a settlement risk, etc.). Third, grouping similar user accounts in a financial management system by analyzing financial transactions associated with the accounts is not an abstract idea because it is not a method of organizing human activity (e.g., managing a game of bingo). Fourth, although mathematics may be used to generate an analytics model, the disclosed and claimed methods and systems of grouping similar user accounts in a financial management system by analyzing financial transactions associated with the accounts are not an abstract idea because the methods and systems are not simply a mathematical relationship/formula.

Grouping similar user accounts in a financial management system by analyzing financial transactions associated with the accounts is not an abstract idea because having an accounting system understand the actual usage patterns of each user's account yields significant improvement to the technical fields of user experience, customer service, customer retention, and electronic financial management, according to one embodiment. The present disclosure adds significantly to the field of electronic financial management because the disclosed financial management system increases the knowledge of the needs and purposes of users of the financial management system, increases the ability of the financial management system to provide automated assistance in sorting, grouping and categorizing financial transactions, increases the likelihood of improving/maintaining a user's trust in the financial management system; and reduces the amount of time users spend managing their finances, according to one embodiment.

As a result, embodiments of the present disclosure allow for reduced use of processor cycles, memory, and power consumption, by reducing the time spent by users sorting financial transactions. Consequently, computing and communication systems implementing or providing the embodiments of the present disclosure are transformed into more operationally efficient devices and systems.

In addition to improving overall computing performance, grouping similar user accounts in a financial management system by analyzing financial transactions associated with the accounts significantly improves the field of financial management systems by reducing the amount of time it takes for a user to sort financial transactions, according to one embodiment. Therefore, both human and non-human resources are utilized more efficiently. Furthermore, by grouping similar user accounts in a financial management system by analyzing financial transactions associated with the accounts, loyalty in the financial management system is increased. This results in repeat customers, efficient financial management services, and reduced abandonment of use of the financial management system, according to one embodiment.

Figure 1:
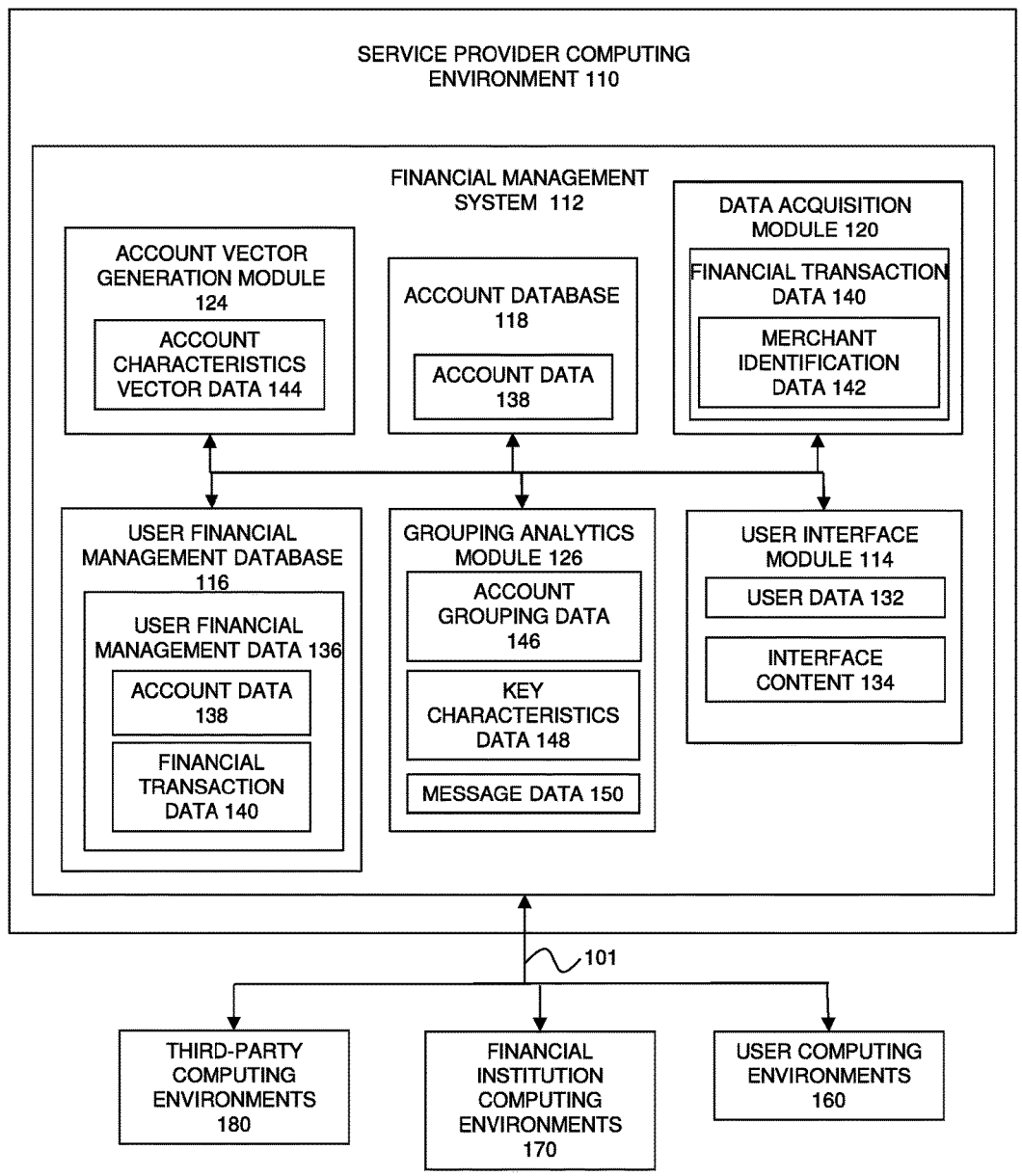
FIG. 1 is a block diagram of software architecture for grouping similar user accounts in a financial management system, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer (SSL) communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed financial management system determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data As used herein, the term "account" includes, but is not limited to, a grouping of transactions within an accounting system. For instance, in various embodiments, accounts can be hierarchical in that one account can contain the content of one or more other accounts. Apart for hierarchical nesting accounts may also be structured to be either mutually exclusive or not mutually exclusive such that if there is a containment relationship between two accounts the containment may either be complete or partial.

Hardware Architecture

FIG. 1 illustrates a block diagram of a production environment 100 for grouping similar user accounts in a financial management system, according to one embodiment. Embodiments of the present disclosure provide methods and systems for grouping similar user accounts in a financial management system, according to one embodiment. The financial management system enables each user of the financial management system to create various accounts into which the user can sort financial transactions of the user as a tool for managing the user's finances and keeping track of financial expenditures and revenues. Embodiments of the present disclosure group the accounts of the users into groups of similar accounts based on the types of financial transactions that are associated with the accounts. Embodiments of the present disclosure can accomplish the grouping by generating account characteristics vector data that includes, for each account, a respective account characteristics vector. Each account characteristics vector includes a plurality of data fields. Each data field is associated with one or more merchants. The data entry in each data field is indicative of the number or rate of occurrence of financial transactions of the user involving the one or more merchants associated with that data field and that have been assigned to the account. Embodiments of the present disclosure generate account grouping data by performing grouping analysis on the account characteristics vectors. The grouping analysis identifies which account characteristics vectors are similar to each other and forms groups of similar account characteristics vectors. Because each account characteristics vector represents an account, the accounts can be sorted into groups of similar accounts based on the similarities in the account characteristics vectors. The grouping of accounts addresses some of the drawbacks of traditional financial management systems in which it is difficult to assist users in assigning their financial transactions to proper groups because the names and purposes of the groups are user selected and are unknown to the traditional financial management system. Embodiments of the present disclosure enable the financial management system to determine a type of each account. This enables the financial management system to assist users in sorting financial transactions and enables the financial management system to provide improved data management services.

In addition, the disclosed method and system for grouping similar user accounts in a financial management system provides for significant improvements to the technical fields of electronic financial transaction data processing, data processing, data management, and user experience.

In addition, as discussed above, the disclosed method and system for grouping similar user accounts in a financial management system provide for the processing and storage of smaller amounts of data, i.e., more efficiently provide financial management services; thereby eliminating unnecessary data analysis and storage. Consequently, using the disclosed method and system for grouping similar user accounts in a financial management system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for grouping similar user accounts in a financial management system.

The production environment 100 includes a service provider computing environment 110, user computing environments 160, financial institution computing environments 170, and third-party computing environments 180, for grouping similar user accounts in a financial management system, according to one embodiment. The computing environments 110, 160, 170, and 180 are communicatively coupled to each other with one or more communication channels 101, according to one embodiment.

The service provider computing environment 110 represents one or more computing systems such as one or more servers and/or distribution centers that are configured to receive, execute, and host one or more financial management systems (e.g., applications) for access by one or more users, for grouping similar user accounts in a financial management system, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes a financial management system 112, which is configured to provide financial management services to a plurality of users.

According to one embodiment, the financial management system 112 is an electronic financial accounting system that assists users in book-keeping or other financial accounting practices. Additionally, or alternatively, the financial management system can manage one or more of tax return preparation, banking, investments, loans, credit cards, real estate investments, retirement planning, bill pay, and budgeting. The financial management system 112 can be a standalone system that provides financial management services to users. Alternatively, the financial management system 112 can be integrated into other software or service products provided by a service provider.

In one embodiment, the financial management system 112 can assist users in tracking expenditures and revenues by retrieving financial transaction data related to financial transactions of users and by enabling the users to sort the financial transactions into accounts. Each user can have multiple accounts into which the user's financial transactions can be sorted. The financial management system 112 enables the users to generate and name their various accounts and to use the accounts for their own financial tracking purposes. Because the names and purposes of the accounts are user generated, the types of accounts, or the way the user uses the accounts, may not be properly discernible by the financial management system 112 based only on the names of the accounts. If the financial management system 112 does not know the type of each account, then the financial management system 112 may not be able to provide adequate financial management services or other data management services.

In one embodiment, the financial management system 112 improves the efficiency and effectiveness of financial management services and other data management services by grouping the accounts of the users into groups based on the similarities of the accounts. In particular, the financial management system 112 generates account characteristics vector data that includes, for each account, a respective account characteristics vector. The account characteristics vector includes data indicating the rate of occurrence of financial transactions with each of a plurality of merchants, or with each of a plurality of groups of merchants. The financial management system 112 performs grouping analysis on the account characteristics vector data in order to determine which account characteristics vectors are similar to each other and to group the account characteristics vectors based on the similarities. In this way, the financial management system 112 can determine the type for each account. This can improve the overall effectiveness of the financial management system 112.

The financial management system 112 includes a user interface module 114, a user financial management database 116, an account database 118, a data acquisition module 120, an account vector generation module 124, and a grouping analytics module 126, according to one embodiment.

The user computing environments 160 correspond to computing environments of the various users of the financial management system 112. The users of the financial management system 112 utilize the user computing environments 160 to interact with the financial management system 112. The users of the financial management system 112 can use the user computing environments 160 to provide data to the financial management system 112 and to receive data, including financial management services, from the financial management system 112.

In one embodiment, the users of the financial management system can include businesses, organizations, government entities, individuals, groups of individuals, or any other entities for which financial management services would be beneficial, according to one embodiment. Businesses of all kinds, including large corporations, midsize companies, small businesses, or even sole proprietor businesses, can utilize the financial management system 112 to track and sort their financial transactions into various accounts as a way to better manage their finances. Likewise, government organizations may use the financial management system 112 to sort their financial transactions into accounts in order to track various types of expenditures and revenues. Organizations other than businesses and government entities, such as nonprofit organizations, may also utilize the financial management system 112 for the purpose of monitoring and sorting expenditures and revenues. Furthermore, individuals may utilize the financial management system 112 to track their own revenues and expenditures. Thus, the term "user" can refer to many types of entities.

Returning to the financial management system 112, the user interface module 114 is configured to receive user data 132 from the users, according to one embodiment. The user data 132 includes information, such as, but not limited to a name of a business, and address of a business, data related to individuals associated with the business, employee data, payroll data, authentication data that enables the user to access the financial management system, or any other types of data that a user may provide in working with the financial management system 112.

In one embodiment, the user data 132 can include financial institution authentication data that enables the financial management system 112 to access the financial accounts that the user has with third-party financial institutions or other third-parties. In one embodiment, the financial institution authentication data provided by the users as part of the user data 132 enables the financial management system 112 to acquire information related to financial transactions of the users. The financial institution authentication data can include data that allows the financial management system 112 to gain access to credit card data, bank account data, retirement fund data, payroll data, income data, loan data, interest accrual data, student loan data, property ownership data, tax data, budgeting data, rent data, investments data, employment data, or other types of data regarding financial transactions or financial accounts of the users. Thus, the financial institution authentication data can include login credentials and personal identification data for various websites of third-party financial institutions. The financial institution authentication data of user data 132 can include usernames, passwords, bank account numbers, routing numbers, credit card numbers, answers to security questions, identification numbers, government identification numbers, birth dates, addresses, or other types of verification credentials that allow the financial management system 112 to gain access to online services of third-party financial service institutions.

In one embodiment, the user data 132 can also include data provided by the users to create and name the various accounts that the users will use to sort and categorize financial transactions. These accounts can correspond to categories of revenues or expenses of the users into which financial transactions of the users can be sorted. The users can generate the accounts so that the financial management system 112 can assist the users in better managing their finances.

In one embodiment, because the users can name the accounts however they like, it can be difficult to determine how the users use the accounts or how the users intend to use the accounts. For example, two businesses that use the financial management system 112 may each have an account named "travel". The first business may utilize its "travel" account to track the traveling expenses of employees. These expenses may commonly include plane tickets, hotel charges, dinner expenses, taxi expenses, or other expenses commonly incurred when an individual travels for a meeting or conference. The second business may utilize its "travel" account primarily for expenses related to the maintenance of a fleet of company cars that sales people use as they travel about their respective regions making sales calls. Thus, the travel account of the second business may commonly include expenses such as gasoline, tire repair, monthly car payments, or new car purchases. Therefore, although the two accounts are similarly named, the types of expenses that are sorted into these accounts are quite different.

If a financial management system were to try to sort new financial transactions of these two users into these accounts based only on their names, it is likely that the financial management system 112 would not properly sort the expenses in accordance with the purposes of at least one of the two companies.

Additionally, two companies may include accounts that are nearly identical in purpose, but have entirely dissimilar names. For example, a first company may have an account titled stationary that includes expenses related to stocking office supplies such as paper, pens, printing ink, etc. A second company may have an account named simply with the initials PPI. The second company uses this account to track expenses related to the purchase of office supplies such as paper, pens, and ink for printers. Thus, even though the names of these two accounts are entirely dissimilar, they nevertheless are utilized for the same general purpose by the first and second companies.

If a financial management system were to try to sort expenses related to these accounts, it is possible that a financial management system would not properly sort financial transactions related to the account titled "stationary". However, it is unlikely that a financial management system will properly sort expenses related to the account titled PPI. Thus, relying merely on the name of an account in order to understand the purpose of the account can lead to many problems.

Furthermore, it can be beneficial for a financial management system or a data management system to understand the purposes of user generated accounts for purposes such as identifying companies with similar accounting practices or for other such purposes.

In one embodiment, the user interface module 114 provides interface content 134 to the user's computing environments 160. The interface content 134 can include data enabling a user to obtain the current status of the user's accounts. For example the interface content 134 can enable the user to select among the user's accounts in order to view financial transactions associated with the user's accounts. The interface content 134 can enable a user to view the overall state of many accounts. The interface content 134 can also enable a user to select among the various options in the financial management system in order to fully utilize the services of the financial management system. The user can provide user data 132 in conjunction with the interface content 134 in order to sort financial transactions of the user into the users accounts.

In one embodiment, the financial management system 112 includes user financial management database 116. The user financial management database 116 includes the user financial management data 136. The user financial management data 136 can include data indicating the current status of all of the accounts of all of the users of the financial management system. Thus, the user financial management database 116 can include a vast amount of data related to the financial management services provided to users. In one embodiment, when the user utilizes the interface module 114 to view interface content 134, the interface content 134 includes user financial and management data 136 retrieved from the user financial management database 116.

In one embodiment, the user financial management data 136 includes account data 138 and financial transaction data 140. The user financial management data 136 can include, for each account of each user, a list of the financial transactions associated with the account. Thus, the user financial management data 136 can include a large number of accounts and a large number of financial transactions that have been sorted into each account.

In one embodiment, each financial transaction in the user financial management data 136 includes merchant identification data that identifies the merchant or vendor involved in the financial transaction. In one example, a particular user has an account for expenses related to food provided to employees during lunch meetings, for special occasions, for office parties, etc. The merchant identification data for these financial transactions may identify various restaurants, bakeries, grocery stores, and caterers. These restaurants, bakeries, grocery stores, and caterers are the merchants or vendors associated with the financial transactions associated with that account.

In one embodiment, the financial management system 112 includes an account database 118. The account database 118 includes account data 138. The account data 138 can include a list of accounts of all the users and some or all of their properties. The account database 118 can be a database separate from the user financial management database 116. Alternatively, the account database 118 can be a part of the user financial management data 136.

In one embodiment, the data acquisition module 120 is configured to use the financial institution authentication data provided in the user data 132 to acquire financial transaction data 140 related to financial transactions of the users from the financial institution computing environments 170. In particular, the data acquisition module 120 uses the financial institution authentication data to log into the online services of third-party financial institutions in order to retrieve financial transaction data 140 related to the financial transactions of users of the financial management system 112. The data acquisition module 120 access the financial institutions by interfacing with the financial institution computing environments 170. The financial transaction data 140 can include bank account deposits, bank account withdrawals, credit card transactions, credit card balances, credit card payment transactions, online payment service transactions such as PayPal transactions or other online payment service transactions, loan payment transactions, investment account transactions, retirement account transactions, mortgage payment transactions, rent payment transactions, bill pay transactions, budgeting information, or any other types of financial transactions. The data acquisition module 120 is configured to gather the financial transaction data 140 from financial institution computing environments 170 related to financial service institutions with which one or more users of the financial management system 112 have a relationship.

In one example, the data acquisition module 120 uses the financial institution authentication data to acquire data related to withdrawals, deposits, and balances in the bank accounts of users. The financial transaction data 140 includes data related to these withdrawals, deposits, and balances. Accordingly, the financial institution authentication data of user data 132 can include usernames, passwords, bank account numbers, routing numbers, or other validation credentials needed to access online services of various banking institutions.

In one embodiment, the financial transaction data 140 includes merchant identification data 142. Each financial transaction received in the financial transaction data 140 can include a merchant identification indicated by the merchant identification data 142. The financial management system 112 can use the merchant identification data 142 to assist the users in sorting their financial transactions into the various accounts of the users.

In one embodiment, the merchant identification data 142 includes a merchant string. The merchant string can include a data string associated with a credit card transaction, a bank transaction, a checking account transaction, an online payment transaction, or other kinds of financial transactions. The merchant string for a given financial transaction may include a name of the merchant involved in the financial transaction, a part of the name of the merchant, a code associated with the merchant, an address associated with the merchant, or other types of data that can potentially identify the merchant.

In one embodiment, the data acquisition module 120 is configured to acquire data from third-party computing environments 180. The data acquisition module 120 can request and receive data from the third-party computing environments 180 to supply or supplement the financial transaction data 140, according to one embodiment. In one embodiment, the third-party computing environments 180 automatically transmit financial data to the financial management system 112 (e.g., to the data acquisition module 120), to be merged into the financial transaction data 140. The third-party computing environment 180 can include, but is not limited to, financial service providers, state institutions, federal institutions, private employers, financial institutions, social media, and any other business, organization, or association that has maintained financial data, that currently maintains financial data, or which may in the future maintain financial data, according to one embodiment.

In one embodiment, the financial management system 112 can keep a list of the financial transactions and their associated merchant identification data 142 so that users can access the user financial management data 136 and see a list of financial transactions to be sorted into the accounts of the users. The users can then sort the financial transactions into the accounts. Alternatively, the data acquisition module 120 can automatically sort some of the financial transactions into the accounts of the users. However, as described previously, it can be difficult to sort financial transactions into the accounts when the nature of the accounts are not fully understood by the financial management system 112.

According to one embodiment, in order gain a more useful understanding of the nature of the accounts of the users, the financial management system 112 groups the accounts of the users into groups of similar accounts. This can assist the financial management system in many ways. In one embodiment, grouping the accounts can assist the financial management system 112 in automatically sorting the financial transactions associated with the financial transaction data 140 into the correct accounts. In one embodiment, grouping the accounts can assist the financial management system 112 in understanding which businesses or organizations have similar accounting practices. Many other benefits can result from having a more complete understanding of the nature and purposes of the user accounts.

In one embodiment, the financial management system 112 utilizes the account vector generation module 124 as part of the grouping process. In one embodiment, the account vector generation module 124 generates account characteristics vector data 144. The account characteristics vector data 144 includes, for each account in the account data 138, a respective account characteristics vector. Thus, in one embodiment the account vector generation module 124 generates one account characteristics vector for each account. If the financial management system 112 includes millions of users each having multiple accounts, then the account characteristics vector data 144 can include many millions of account characteristics vectors. These account characteristics vectors can be used in the grouping process, according to one embodiment.

In one embodiment, each account characteristics vector in the account characteristics vector data 144 includes a plurality of data fields. In one embodiment, each data field corresponds to a respective merchant or merchant identification. Each data field includes a respective data value. The data value is an indication of a number, frequency, or rate of financial transactions from that account that involve the merchant associated with that data field. Thus, in one embodiment, a higher data value indicates a higher number, proportion, or rate of occurrence of financial transactions involving the merchant and assigned to that account. A data value of zero can indicate that either no financial transactions have occurred with that merchant and that account, or that a statistically insignificant number of financial transactions have occurred with that merchant and that account.

In one embodiment, because some businesses or organizations may be much larger than other businesses or organizations, the sheer number of financial transactions for those businesses or organizations may be much higher than the number of financial transactions for other businesses or organizations that are smaller. Thus, merely listing, as a data value for a data field of an account characteristics vector, the number of transactions that involve a particular merchant may not be as meaningful when trying to find similar accounts associated with different users. Accordingly, in one embodiment, the data values in the respective data fields of an account characteristics vector can be normalized data values. For example, the data values can be normalized such that each data value represents a proportion of the total number of financial transactions. In one embodiment, the data values can be weighted. In one embodiment, the data values can represent a simple percentage of the total number of financial transactions that involve that merchant. These ways of generating data values for the various data fields of the account characteristics vectors can be more useful when utilizing the account characteristics vectors to determine which accounts are similar to each other as far as accounting purposes are concerned, as will be set forth in more detail below.

In one embodiment, the account vector generation module 124 generates the data values for the data fields of the account characteristics vectors using a term frequency inverse document frequency (TF-IDF) process. In the TF-IDF process for generating a single data value in a single data field of a single account, the account vector generation module 124 counts the fraction of financial transactions that are assigned to that account and involve the merchant associated with the data field. The account vector generation module 124 then counts the total number of accounts that include a financial transaction involving the relevant merchant. The account vector generation module 124 then generates the data value by multiplying the fraction of financial transactions involving the merchant from the account by the logarithm of the inverse of the total fraction of accounts that include a financial transaction with the merchant that corresponds to the data field for which the data value is being computed. The account vector generation module 124 can generate data values for each data field of the account characteristics vector using the TF-IDF process. The account vector generation module 124 can generate an account characteristics vector for each account in the account database 118.

In one embodiment, the account characteristics vector generation module 124 can generate the data values for the data fields of the account characteristics vectors by taking the logarithm of the result of the TF-IDF process. Thus, the data value in a given data field of a given account vector can correspond to the logarithm of a number generated by the TF-IDF process. In one embodiment, the account vector generation module 124 uses a base 2 logarithm for the calculation. Alternatively, the account vector generation module 124 can use a logarithm with a base other than 2.

In one embodiment, each data field of an account characteristics vector can correspond to a group of merchants or merchant identifications. For example, rather than having a data field for each merchant gas station, a single data field can correspond to multiple gas stations. Each gas station may have its own merchant identification. Thus, a single data field may correspond to multiple merchant identifications for the various gas stations in the group. Thus, when generating a data value for the data field, the number of financial transactions for each of the gas stations in the group can be summed together to provide a data value. This sum can then be weighted, averaged, normalized, passed through a TF-IDF process, or otherwise processed to generate the data value for the data field.

In one embodiment, associating the data fields of the account characteristics vectors with multiple merchants or merchant identifications can greatly improve the efficiency of the financial management system 112. In particular, the length or number of data fields of the account characteristics vectors can be reduced. There may be millions of known merchants. Thus, a single account characteristics vector could have millions of data fields. However, if the data fields include groups of merchants or merchant identifications, then the number of data fields in the account characteristics vectors can be reduced to thousands, or even hundreds of data fields.

In one embodiment, the financial management system 112 utilizes the grouping analytics module 126 to form groups of similar accounts. In particular, the grouping analytics module 126 can process the account characteristics vector data 144 including all of the account characteristics vectors in order to find groups of similar account characteristics vectors. The groups of account characteristics vectors correspond to groups of accounts associated with those account characteristics vectors. Thus, the grouping analytics module 126 can find groups of similar accounts by finding groups of similar account characteristics vectors.

In one embodiment, the financial management system 112 generates account grouping data 146. The account grouping data 146 can identify groups of accounts. The accounts are grouped based on the similarities in the financial transactions associated with the accounts. After the groups of accounts are formed, the financial management system 112 can use the account grouping data 146 in any of a number of ways to improve the efficiency and effectiveness of the financial management system 112 and to identify users that have similar accounting practices based on the similarities in the accounts associated with those users.

In one embodiment, the grouping analytics module 126 generates the account grouping data 146 by applying one or more clustering algorithms to the account characteristics vectors data. In particular, the grouping analytics module 126 can apply the one or more clustering algorithms to the account characteristics vectors represented by the account characteristics vectors data 144. The clustering algorithms can identify account characteristics vectors that are similar to each other. The clustering algorithms can determine how similar or dissimilar two account characteristics vectors are based on the similarities between the data values in the data fields.

In one embodiment, similar account characteristics vectors will include vectors that have similar data values in many of their data fields. Accounts that are used by different users for similar purposes will have financial transactions with some or many of the same or similar merchants. Likewise, there will be vast groups of merchants or categories of merchants for which the similar accounts have no financial transactions. Two similar accounts will likely not have financial transactions with all the same merchants, but they will have financial transactions with some of the same merchants or similar kinds of merchants.

In one embodiment, the grouping analytics module 126 generates the account grouping data 146 by applying one more clustering algorithms to the account characteristics vector data 144 to generate the account grouping data 146. In one embodiment, the clustering algorithms can include a K means algorithm. In one embodiment, the clustering algorithms can include a density-based spatial clustering of applications with noise (DBSCAN) clustering algorithm. In one embodiment, the clustering algorithms can include an affinity propagation algorithm. The grouping analytics module 126 can use one or more of these clustering algorithms or other clustering algorithms in generating the account grouping data 146. In one embodiment, the grouping analytics module 126 can use different types of algorithms to generate the account grouping data 146.

In one embodiment, the grouping analytics module 126 can generate key characteristics data 148. The grouping analytics module 126 can generate the key characteristics data 148 by analyzing the account grouping data 146 in order to identify key characteristics of the accounts in each group. The key characteristics can correspond to characteristics that most strongly correlate with inclusion in the group. Based on these key characteristics, the grouping analytics module 126 can further refine the account grouping data 146 to make the account grouping data 146 more accurate. Additionally, or alternatively, the grouping analytics module 126 can use the key characteristics data 148 in order to sort new accounts generated by users of the financial management system.

In one embodiment, the key characteristics that correlate with inclusion in a group can correspond to particular merchants, groups of merchants, or types of merchants with whom the accounts in the group include financial transactions. The accounts in a particular group may have transactions with particular merchants or groups of merchants at a significantly higher rate than the entire population of accounts. Thus, these particular merchants, groups of merchants, or types of merchants may characterize the accounts in a particular group.

Furthermore, the key characteristics data 148 can include threshold data values for certain data fields (not shown). The accounts in a group may have a significantly higher number of financial transactions with certain merchants, groups of merchants, or types of merchants than accounts outside the group. Some accounts outside a group may include financial transactions with merchants associated with the key characteristics data 148 associated with the group. However, the characterizing factor may be that the accounts in the group have a much higher number or proportion of financial transactions with those merchants, groups of merchants, or types of merchants. Thus, the key characteristics merchant data 148 can include threshold data values in data fields associated with certain merchants, groups of merchants, or types of merchants. An account that has data values below the threshold data values for some or all of key data fields may fall outside the group. Accounts that have data values above the threshold data values for some or all of the key data fields may be included in the group.

In one embodiment, the financial management system 112 utilizes the key characteristics data 148 and the account grouping data 146 to revise each other in a recursive manner. The key characteristics data 148 may be generated based on an analysis of the initially generated account grouping data 146. The financial management system may then utilize the key characteristics data to generate additional or revised merchant grouping data. After the additional or revised merchant grouping data has been generated, the financial management system 112 can again generate key characteristics data 148 based on the new account grouping data 146. These recursive revisions may cause some accounts to be dropped from one group and to be newly included in a different group. Furthermore, as users of the financial management system 112 generate new accounts, these accounts can be put into groups based on more accurate account grouping data 146 and key characteristics data 148.

In one embodiment, merchant grouping can be performed based on merchants that appear in the same group of accounts. This can lead to a recursive process of refinement for account and merchant grouping.

In one embodiment, when new accounts are generated by new or existing users of the financial management system 112, the financial management system 112 generates account characteristics vector data 144 including account characteristics vectors for those new accounts. The financial management system 112 then sorts the new accounts into groups. The sorting of the new accounts of the groups can be based on performing one or more clustering algorithms. Additionally, or alternatively, the sorting of the new accounts into groups can be based on the key characteristics data 148. Thus, an account characteristics vector can be analyzed to determine if the account characteristics vector shares key characteristics with one or more of the groups. The account can be sorted into the group with which the account characteristics vector shares the most key characteristics. The process of generating an account characteristics vector for a new account may need to be delayed until sufficient numbers of financial transactions have been sorted by the users into the new accounts.

In one embodiment, after the grouping analytics module 126 has generated the account grouping data 146, the financial management system 112 can utilize the account grouping data 146 to the advantage of the financial management system 112. In one embodiment, as the data acquisition module 120 gathers additional financial transaction data 140, the financial management system 112 can automatically sort the new financial transactions into accounts. For example, for each financial transaction, the financial management system 112 may analyze the merchant identification data 142 to determine a merchant identification, such as a merchant string, and then identify the group that is most strongly correlated with that merchant identification or merchant string. When the financial management system 112 has identified a group most strongly related to the merchant identification, the financial management system 112 can check to see whether the user associated with the financial transaction has an account in the group. If the user has an account in the group, then the financial transaction can be sorted into that account. If the user doesn't have an account in the group, then the financial management system 112 can check to see if the user has an account in another group strongly associated with the merchant identification. This process can continue until the financial management system 112 has found an account of the user in a group that is strongly associated with the merchant identification. The financial management system 112 can then sort the financial transaction into that account.

In one embodiment, instead of automatically sorting the financial transaction into a relevant account, the financial management system 112 can prompt the user to allocate the financial transaction to the account. The user can then decide whether the financial transaction should be placed in the account. Alternatively, the financial management system 112 can automatically sort the financial transaction into an account and can then inform the user that the financial transaction has been sorted into the account and can give the user the option to undo the sorting. Alternatively, the financial management system 112 can generate message data asking the user to approve the sorting of the financial transaction into the account. If the user indicates that the user approves of the sorting, then the financial management system 112 can sort the financial transaction into the account.

In one embodiment, the grouping analytics module 126 generates message data 150. The message data 150 can include a message to the user. The message can include a notification that a financial transaction has been automatically sorted. The message can include a request to approve the sorting of a financial transaction into an account. The message can include a suggestion to the user to sort a financial transaction into an account. The message data 150 can include other types of messages, notifications, or prompts.

In one embodiment, the financial management system 112 may utilize the account grouping data 146 to identify users that have similar accounting practices. For example, the financial management system 112 can analyze the account grouping data 146 to identify users that have accounts in the same groups. This can indicate that these users have similar accounting practices. The financial management system 112 can utilize this data to more effectively provide financial management services to the users. The financial management system 112 can utilize this data to more effectively develop new products and services for these users.

Figure 2:
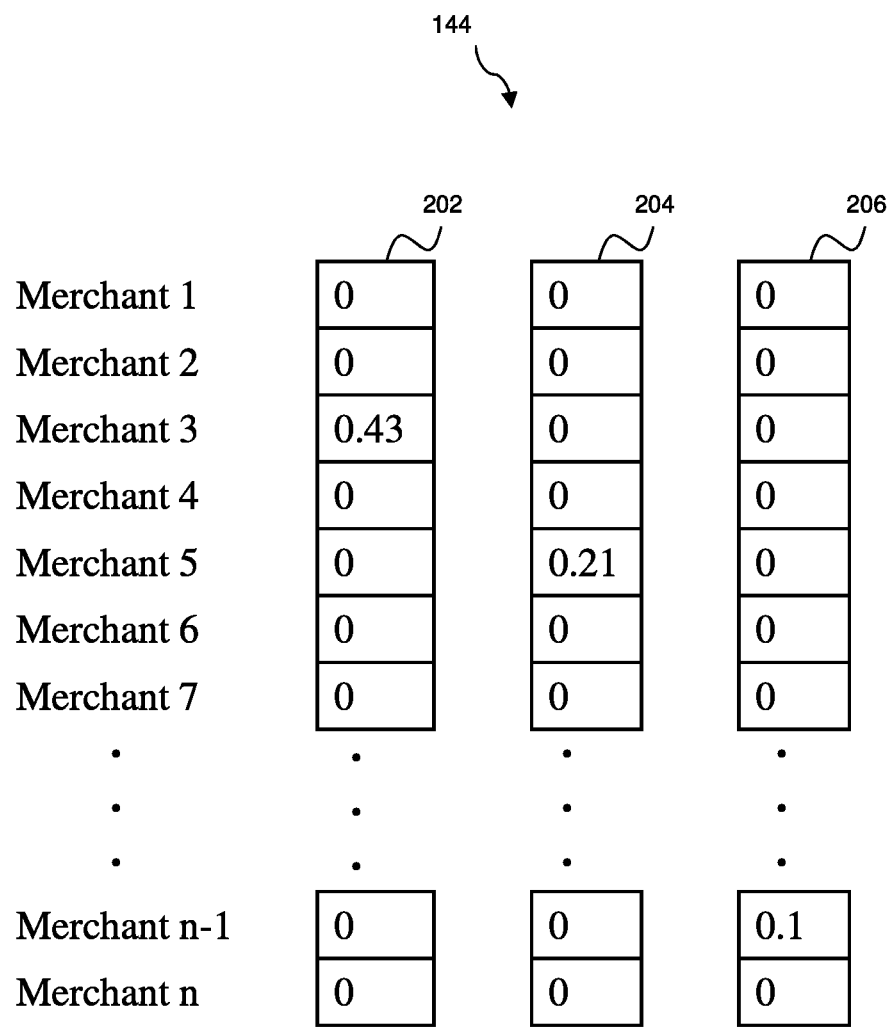
FIG. 2 is a diagram representing account characteristics vector data, in accordance with one embodiment.

FIG. 2 is a diagram illustrating a portion of the account characteristics vector data 144 and including representations of three account characteristics vectors 202, 204, and 206. The vector 202 corresponds to an account of a first user. The vector 204 corresponds to an account of a second user. The vector 206 corresponds to an account of a third user. While only three account characteristics vectors are shown in FIG. 2, in practice the account characteristics vector data 144 can include millions of account characteristics vectors. Each of the account characteristics vectors include n data fields, though only nine data fields are shown for each account characteristics vector 202, 204, 206. Each data field corresponds to a respective merchant identification. Thus, there are n possible merchant identifications. Each merchant identification corresponds to a merchant known to the financial management system 112. In practice, each of the vectors 202, 204, 206 could include thousands or even millions of data fields.

In one embodiment, each data field of the account characteristics vectors 202, 204, 206 includes a respective data value. The account characteristics vector 202 includes data values of 0 in each of the shown data fields except for the data field that corresponds to merchant 3. This indicates that the account corresponding to the account characteristics vector 202 had no financial transactions associated with merchants 1, 2, 4-7, n−1, n. The account corresponding to the account characteristics vector 202 had a number of financial transactions with merchant 3 such that a data value of 0.43 is present in the data field corresponding to merchant 3. The value of 0.43 could be a result of a normalizing function, an averaging function, a weighting function, a TF-IDF function, or another kind of function by which the number of financial transactions with merchant 3 is processed to produce the data value 0.43. In an account characterization vector most of the data values may be zero due to the often very large number of possible merchants known to the financial management system.

The account characteristics vector 204 includes data values of 0 in each of the shown data fields except for the data field that corresponds to merchant 5. This indicates that the account corresponding to the account characteristics vector 204 had no financial transactions associated with merchants 1-4, 6, 7, n-1, n. The account corresponding to the account characteristics vector 204 had a number of financial transactions with merchant 5 such that a data value of 0.21 is present in the data field corresponding to merchant 5. The value of 0.21 could be a result of a normalizing function, an averaging function, a weighting function, a TF-IDF function, or another kind of function by which the number of financial transactions with merchant 5 is processed to produce the data value 0.21.

The account characteristics vector 206 includes data values of 0 in each of the shown data fields except for the data field that corresponds to merchant n-1. This indicates that the account corresponding to the account characteristics vector 206 had no financial transactions associated with merchants 1-7, n. The account corresponding to the account characteristics vector 206 had a number of financial transactions with merchant n-1 such that a data value of 0.1 is present in the data field corresponding to merchant n-1. The value of 0.1 could be a result of a normalizing function, an averaging function, a weighting function, a TF-IDF function, or another kind of function by which the number of financial transactions with merchant n-1 is processed to produce the data value 0.1.

In one embodiment, the grouping analytics module 126 (FIG. 1) can analyze the account characteristics vector data 144 including the account characteristics vectors 202, 204, 206, (FIG. 2) and thousands or millions of other account characteristics vectors in order to generate account grouping data 146 (FIG. 1) by which the account characteristics vectors are sorted into groups of similar account characteristics vectors, as described previously.

Figure 3:
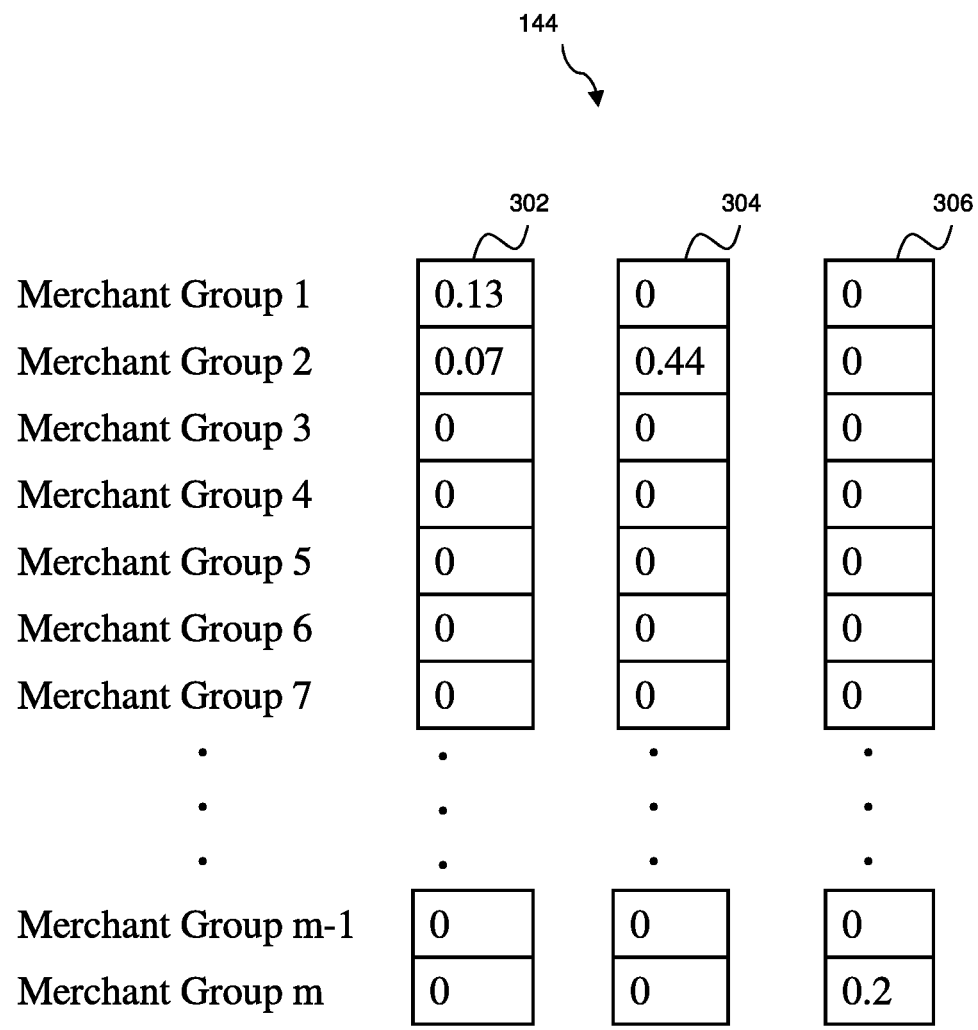
FIG. 3 is a diagram representing account characteristics vector data, in accordance with one embodiment.

FIG. 3 is a diagram illustrating a portion of the account characteristics vector data 144 and including representations of three account characteristics vectors 302, 304, and 306, according to one embodiment. The vector 302 corresponds to an account of a first user. The vector 304 corresponds to an account of a second user. The vector 306 corresponds to an account of a third user. While only three account characteristics vectors are shown in FIG. 3, in practice the account characteristics vector data 144 can include millions of account characteristics vectors. Each of the account characteristics vectors include m data fields, though only nine data fields are shown for each account characteristics vector 302, 304, 306. Each data field corresponds to a respective group of merchant identifications. Thus, there are m groups of merchant identifications. Each group of merchant identification corresponds to a group of merchants known to the financial management system 112.

In one embodiment, grouping the merchants into groups of similar merchants can reduce the number of data fields in an account characteristics vector compared to a situation in which each data field represents only a single merchant identification. Thus, a data value in a data field can be based on financial transactions with multiple merchants.

The account characteristics vector 302 includes data values of 0 in each of the shown data fields except for the data fields that corresponds to merchant groups 1 and 2. This indicates that the account corresponding to the account characteristics vector 302 had no financial transactions associated with merchant groups 2-7, m-1, m. The account corresponding to the account characteristics vector 302 had a number of financial transactions with merchant group 1 such that a data value of 0.13 is present in the data field corresponding to merchant group 1. The value of 0.13 could be a result of a normalizing function, an averaging function, a weighting function, a TF-IDF function, or another kind of function by which the number of financial transactions with merchant group 1 is processed to produce the data value 0.13. The account corresponding to the account characteristics vector 302 had a number of financial transactions with merchant group 2 such that a data value of 0.07 is present in the data field corresponding to merchant group 2. The value of 0.07 could be a result of a normalizing function, an averaging function, a weighting function, a TF-IDF function, or another kind of function by which the number of financial transactions with merchant group 2 is processed to produce the data value 0.07.

The account characteristics vector 304 includes data values of 0 in each of the shown data fields except for the data field that corresponds to merchant group 2. This indicates that the account corresponding to the account characteristics vector 304 had no financial transactions associated with merchant groups 1, 3-7, m-1, m. The account corresponding to the account characteristics vector 304 had a number of financial transactions with merchant group 2 such that a data value of 0.44 is present in the data field corresponding to merchant group 2. The value of 0.44 could be a result of a normalizing function, an averaging function, a weighting function, a TF-IDF function, or another kind of function by which the number of financial transactions with merchant group 2 is processed to produce the data value 0.44.

The account characteristics vector 306 includes data values of 0 in each of the shown data fields except for the data field that corresponds to merchant group m. This indicates that the account corresponding to the account characteristics vector 306 had no financial transactions associated with merchant groups 1-7, m-1. The account corresponding to the account characteristics vector 306 had a number of financial transactions with merchant group m such that a data value of 0.2 is present in the data field corresponding to merchant group m. The value of 0.2 could be a result of a normalizing function, an averaging function, a weighting function, a TF-IDF function, or another kind of function by which the number of financial transactions with merchant group m is processed to produce the data value 0.2.

In one embodiment, the grouping analytics module 126 (FIG. 1) can analyze the account characteristics vector data 144 including the account characteristics vectors 302, 304, 306, and thousands or millions of other account characteristics vectors in order to generate account grouping data 146 (FIG. 1) by which the account characteristics vectors are sorted into groups of similar account characteristics vectors as described previously.

Process

Figure 4:
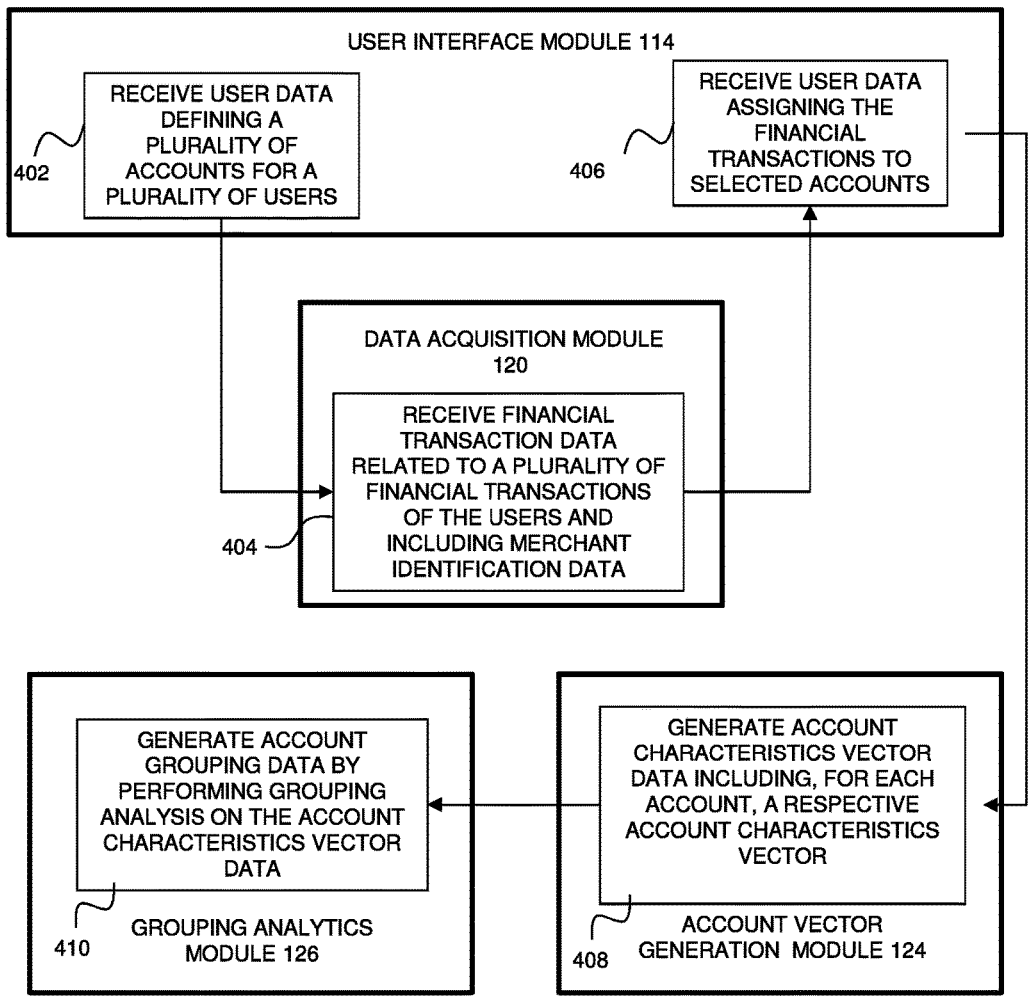
FIG. 4 is a block diagram of a process for grouping similar user accounts in a financial management system, in accordance with one embodiment.

FIG. 4 illustrates a functional flow diagram of a process 400 for grouping similar user accounts in a financial management system, in accordance with one embodiment.

Referring to FIGS. 1 and 4 together, At block 402, the user interface module 114 receives user data defining a plurality of accounts for a plurality of users, in accordance with one embodiment. From block 402, the process proceeds to block 404.

At block 404, the data acquisition module 120 receives financial transaction data related to a plurality of financial transactions of the users and including merchant identification data, in accordance with one embodiment. From block 404, the process proceeds to block 406.

At block 406, the user interface module 114 receives user data assigning the financial transactions to selected accounts, in accordance with one embodiment. From block 406, the process proceeds to block 408.

At block 408, the account vector generation module 124 generates account characteristics vector data including, for each account, a respective account characteristics vector based on the financial transactions associated with the account and based on the merchant identification data, in accordance with one embodiment. From block 408, the process proceeds to block 410.

At block 410, the grouping analytics module 126 generates account grouping data by performing grouping analysis on the account characteristics vector data, in accordance with one embodiment.

Although a particular sequence is described herein for the execution of the process 400, other sequences can also be implemented.

Figure 5:
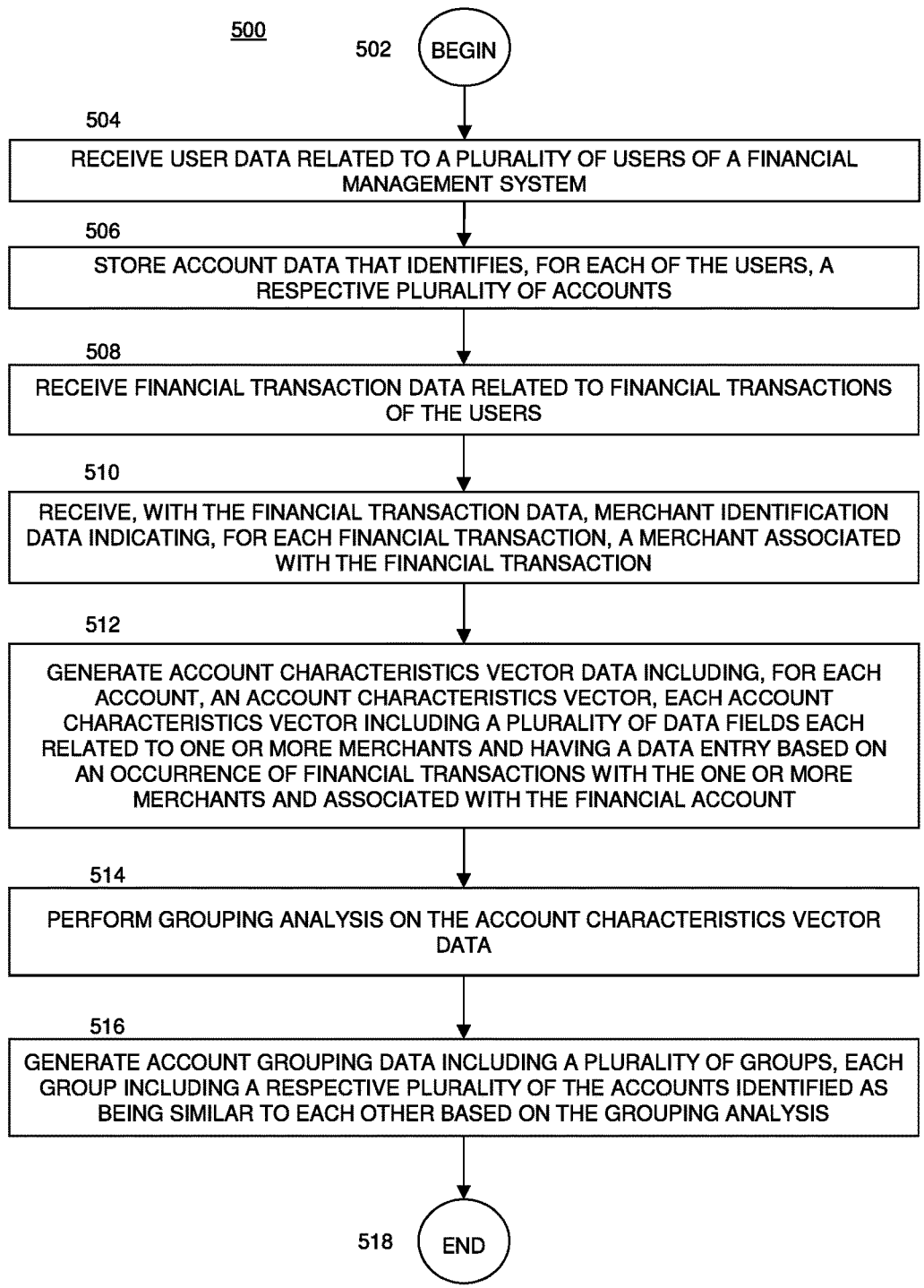
FIG. 5 is a flow diagram of a process for grouping similar user accounts in a financial management system, in accordance with one embodiment.

FIG. 5 illustrates a flow diagram of a process 500 for grouping similar user accounts in a financial management system, according to various embodiments.

In one embodiment, process 500 for grouping similar user accounts in a financial management system begins at BEGIN 502 and process flow proceeds to RECEIVE USER DATA RELATED TO A PLURALITY OF USERS OF A FINANCIAL MANAGEMENT SYSTEM 504.

In one embodiment, at RECEIVE USER DATA RELATED TO A PLURALITY OF USERS OF A FINANCIAL MANAGEMENT SYSTEM 504 process 500 for grouping similar user accounts in a financial management system receives user data related to a plurality of users of a financial system.

In one embodiment, once process 500 for grouping similar user accounts in a financial management system receives user data related to a plurality of users of a financial system at RECEIVE USER DATA RELATED TO A PLURALITY OF USERS OF A FINANCIAL MANAGEMENT SYSTEM 504 process flow proceeds to STORE ACCOUNT DATA THAT IDENTIFIES, FOR EACH OF THE USERS, A RESPECTIVE PLURALITY OF ACCOUNTS 506.

In one embodiment, at STORE ACCOUNT DATA THAT IDENTIFIES, FOR EACH OF THE USERS, A RESPECTIVE PLURALITY OF ACCOUNTS 506, process 500 for grouping similar user accounts in a financial management system stores account data that identifies, for each of the users, a respective plurality of accounts.

In one embodiment, once process 500 for grouping similar user accounts in a financial management system stores account data that identifies, for each of the users, a respective plurality of accounts at STORE ACCOUNT DATA THAT IDENTIFIES, FOR EACH OF THE USERS, A RESPECTIVE PLURALITY OF ACCOUNTS 506, process flow proceeds to RECEIVE FINANCIAL TRANSACTION DATA RELATED TO FINANCIAL TRANSACTIONS OF THE USERS 508.

In one embodiment, at RECEIVE FINANCIAL TRANSACTION DATA RELATED TO FINANCIAL TRANSACTIONS OF THE USERS 508, process 500 for grouping similar user accounts in a financial management system receives financial transaction data related to financial transactions of the users.

In one embodiment, once process 500 for grouping similar user accounts in a financial management system receives financial transaction data related to financial transactions of the users at RECEIVE FINANCIAL TRANSACTION DATA RELATED TO FINANCIAL TRANSACTIONS OF THE USERS 508, process flow proceeds to RECEIVE, WITH THE FINANCIAL TRANSACTION DATA, MERCHANT IDENTIFICATION DATA INDICATING, FOR EACH FINANCIAL TRANSACTION, A MERCHANT ASSOCIATED WITH THE FINANCIAL TRANSACTION 510.

In one embodiment, at RECEIVE, WITH THE FINANCIAL TRANSACTION DATA, MERCHANT IDENTIFICATION DATA INDICATING, FOR EACH FINANCIAL TRANSACTION, A MERCHANT ASSOCIATED WITH THE FINANCIAL TRANSACTION 510 the process 500 receives, with the financial transaction data, merchant identification data indicating, for each financial transaction, a merchant associated with the financial transaction.

In one embodiment, once process 500 receives, with the financial transaction data, merchant identification data indicating, for each financial transaction, a merchant associated with the financial transaction at RECEIVE, WITH THE FINANCIAL TRANSACTION DATA, MERCHANT IDENTIFICATION DATA INDICATING, FOR EACH FINANCIAL TRANSACTION, A MERCHANT ASSOCIATED WITH THE FINANCIAL TRANSACTION 510, process flow proceeds to GENERATE ACCOUNT CHARACTERISTICS VECTOR DATA INCLUDING, FOR EACH ACCOUNT, AN ACCOUNT CHARACTERISTICS VECTOR, EACH ACCOUNT CHARACTERISTICS VECTOR INCLUDING A PLURALITY OF DATA FIELDS EACH RELATED TO ONE OR MORE MERCHANTS AND HAVING A DATA ENTRY BASED ON AN OCCURRENCE OF FINANCIAL TRANSACTIONS WITH THE ONE OR MORE MERCHANTS AND ASSOCIATED WITH THE FINANCIAL ACCOUNT 512.

In one embodiment, at GENERATE ACCOUNT CHARACTERISTICS VECTOR DATA INCLUDING, FOR EACH ACCOUNT, AN ACCOUNT CHARACTERISTICS VECTOR, EACH ACCOUNT CHARACTERISTICS VECTOR INCLUDING A PLURALITY OF DATA FIELDS EACH RELATED TO ONE OR MORE MERCHANTS AND HAVING A DATA ENTRY BASED ON AN OCCURRENCE OF FINANCIAL TRANSACTIONS WITH THE ONE OR MORE MERCHANTS AND ASSOCIATED WITH THE FINANCIAL ACCOUNT 512 the process 500 for grouping similar user accounts in a financial management system generates account characteristics vector data including, for each account, an account characteristics vector, each account characteristics vector including a plurality of data fields each related to one or more merchants and having a data entry based on an occurrence of financial transactions with the one or more merchants and associated with the financial account.

In one embodiment, once the process 500 for grouping similar user accounts in a financial management system generates account characteristics vector data including, for each account, an account characteristics vector, each account characteristics vector including a plurality of data fields each related to one or more merchants and having a data entry based on an occurrence of financial transactions with the one or more merchants and associated with the financial account at GENERATE ACCOUNT CHARACTERISTICS VECTOR DATA INCLUDING, FOR EACH ACCOUNT, AN ACCOUNT CHARACTERISTICS VECTOR, EACH ACCOUNT CHARACTERISTICS VECTOR INCLUDING A PLURALITY OF DATA FIELDS EACH RELATED TO ONE OR MORE MERCHANTS AND HAVING A DATA ENTRY BASED ON AN OCCURRENCE OF FINANCIAL TRANSACTIONS WITH THE ONE OR MORE MERCHANTS AND ASSOCIATED WITH THE FINANCIAL ACCOUNT 512, process flow proceeds to PERFORM GROUPING ANALYSIS ON THE ACCOUNT CHARACTERISTICS VECTOR DATA 514.

In one embodiment, at PERFORM GROUPING ANALYSIS ON THE ACCOUNT CHARACTERISTICS VECTOR DATA 514 the process 500 for grouping similar user accounts in a financial management system performs grouping analysis on the account characteristics vector data.

In one embodiment, once the process 500 for grouping similar user accounts in a financial management system performs grouping analysis on the account characteristics vector data at PERFORM GROUPING ANALYSIS ON THE ACCOUNT CHARACTERISTICS VECTOR DATA 514, process flow proceeds to GENERATE ACCOUNT GROUPING DATA INCLUDING A PLURALITY OF GROUPS, EACH GROUP INCLUDING A RESPECTIVE PLURALITY OF THE ACCOUNTS IDENTIFIED AS BEING SIMILAR TO EACH OTHER BASED ON THE GROUPING ANALYSIS 516.

In one embodiment, at GENERATE ACCOUNT GROUPING DATA INCLUDING A PLURALITY OF GROUPS, EACH GROUP INCLUDING A RESPECTIVE PLURALITY OF THE ACCOUNTS IDENTIFIED AS BEING SIMILAR TO EACH OTHER BASED ON THE GROUPING ANALYSIS 516 the process 500 for grouping similar user accounts in a financial management system generates account grouping data including a plurality of groups, each group including a respective plurality of the accounts identified as being similar to each other based on the grouping analysis.

In one embodiment, once the process 500 for grouping similar user accounts in a financial management system generates account grouping data including a plurality of groups, each group including a respective plurality of the accounts identified as being similar to each other based on the grouping analysis at GENERATE ACCOUNT GROUPING DATA INCLUDING A PLURALITY OF GROUPS, EACH GROUP INCLUDING A RESPECTIVE PLURALITY OF THE ACCOUNTS IDENTIFIED AS BEING SIMILAR TO EACH OTHER BASED ON THE GROUPING ANALYSIS 516, process flow proceeds to END 518.

In one embodiment, at END 518 the process for grouping similar user accounts in a financial management system is exited to await new data and/or instructions.

As noted above, the specific illustrative examples discussed above are but illustrative examples of implementations of embodiments of the method or process for grouping similar user accounts in a financial management system. Those of skill in the art will readily recognize that other implementations and embodiments are possible. Therefore, the discussion above should not be construed as a limitation on the claims provided below.

In one embodiment, a computing system implemented method groups similar user accounts in a financial management system. The method includes receiving user data related to a plurality of users of a financial management system, storing account data that identifies, for each of the users, a respective plurality of accounts, and receiving financial transaction data related to financial transactions of the users. The method also includes receiving, with the financial transaction data, merchant identification data indicating, for each financial transaction, a merchant associated with the financial account and generating account characteristics vector data including, for each account, an account characteristics vector, each account characteristics vector including a plurality of data fields each related to one or more merchants and having a data entry based on an occurrence of financial transactions with the one or more merchants and associated with the financial account. The method also includes performing grouping analysis on the account characteristics vector data and generating account grouping data including a plurality of groups, each group including a respective plurality of the accounts identified as being similar to each other based on the grouping analysis.

In one embodiment, a non-transitory computer-readable medium has a plurality of computer-executable instructions which, when executed by a processor, perform a method for grouping similar user accounts in a financial management system. The instructions include a user interface module configured to receive user data related to a plurality of users of a financial system. The instructions also include a data acquisition module configured to gather financial transaction data related to financial transactions of the users, the financial transaction data including merchant identification data indicating, for each financial transaction, a merchant associated with the financial transaction. The instructions also include an account database configured to store account data that identifies, for each of the users, a respective plurality of accounts. The instructions also include an account vector generation module configured to generate account characteristics vector data including, for each account, an account characteristics vector. Each account characteristics vector includes a plurality of data fields each related to one or more merchants and having a data entry based on an occurrence of financial transactions with the one or more merchants and associated with the financial account. The instructions also include a grouping analytics module configured to generate account grouping data by performing grouping analysis on the account characteristics vector data. The account grouping data includes a plurality of groups. Each group includes a respective plurality of the accounts identified as being similar to each other based on the grouping analysis.

In one embodiment, a system for grouping similar user accounts in a financial management system includes at least one processor and at least one memory coupled to the at least one processor. The at least one memory has stored therein instructions which, when executed by any set of the one or more processors, perform a process. The process includes receiving user data related to a plurality of users of a financial management system, storing account data that identifies, for each of the users, a respective plurality of accounts, and receiving financial transaction data related to financial transactions of the users. The process also includes receiving, with the financial transaction data, merchant identification data indicating, for each financial transaction, a merchant associated with the financial transaction and generating account characteristics vector data including, for each account, an account characteristics vector, each account characteristics vector including a plurality of data fields each related to one or more merchants and having a data entry based on an occurrence of financial transactions with the one or more merchants and associated with the financial account. The process also includes performing grouping analysis on the account characteristics vector data and generating account grouping data including a plurality of groups, each group including a respective plurality of the accounts identified as being similar to each other based on the grouping analysis.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for grouping similar user accounts in a financial management system, the method comprising:
 receiving user data related to a plurality of users of a financial management system;
 receiving, from the plurality of accounts, financial transaction data of financial transactions of the plurality of users;
 receiving, from the plurality of users associated with financial transactions of the financial transaction data, indications of particular user-specific accounts to associate with ones of the financial transactions, the particular user-specific accounts being selected by a user who performed the financial transactions through the financial management system and having a user generated name associated therewith;
 receiving, with the financial transaction data, merchant identification data indicating, for each financial transaction, a merchant associated with the financial transaction;
 generating account characteristics vector data including, for each account, an account characteristics vector, each account characteristics vector including a plurality of data fields, each data field of a given account characteristics vector representing a merchant not represented by other data fields of the plurality of data fields of that given account characteristics vector, each respective data field relating a proportion of financial transactions of a respective merchant of the particular financial account;
 performing grouping analysis on the account characteristics vector data, the grouping analysis including adding accounts to a group that include one or more individual data fields that meet or exceed a minimum proportion threshold set for the individual data field and excluding one or more accounts having account characteristics vector data having an individual data field that does not meet a minimum proportion threshold set for the individual data field; and
 generating account grouping data including a plurality of groups, each group including a respective plurality of the accounts identified as being similar to each other based on the grouping analysis;
 revising the account grouping data to include or exclude at least one account of one group based on key characteristics data associated with the at least one account
 identifying a first merchant associated with a first grouped account from a first group as having a similar accounting practice as a second merchant associated with a second grouped account of the first group;
 receiving a new financial transaction not previously put into an account by an associated user;
 automatically moving the new financial transaction into an account associated with a merchant of other financial transactions of the account
 modifying at least one proportion associated with the merchant, based on the new transaction now being associated with the account.

2. The method of claim 1, wherein each data field corresponds to a single merchant identification.

3. The method of claim 1, wherein each data field corresponds to a group of merchant identifications.

4. The method of claim 1, wherein receiving the financial transaction data includes receiving the financial transaction data from one or more financial institutions associated with the users.

5. The method of claim 4, wherein the financial institutions include one or more banks or credit card institutions.

6. The method of claim 1, wherein the merchant identification data includes, for each financial transaction, a respective merchant string, each merchant string identifying the merchant associated with the financial transaction.

7. The method of claim 6, wherein each data field of an account characteristics vector is associated with one or more respective merchant strings.

8. The method of claim 7, wherein the financial transactions include one or more of:
 banking transactions;
 credit card transactions;
 payment of bills;
 payroll activity;
 insurance payment activity;
 business supply purchases;
 retirement account activity;
 investment activity;
 loan activity;
 interest accrual;
 interest payments;
 mortgage payments;
 rent payments; or
 tax payments.

9. The method of claim 1, wherein the account characteristics vectors all have a same number of data fields.

10. The method of claim 9, wherein each data field of a given account characteristics vector represents the same one or more merchants as the corresponding data field in each of the other account characteristics vectors.

11. The method of claim 1, wherein data value for each data field is a weighted data value based on a number of financial transactions of the financial account associated with the one or more merchants related to the data field.

12. The method of claim 11, further comprising generating each data value of each data field of each account by performing a term frequency inverse document frequency (TF-IDF) operation on the number of financial transactions of the account associated with the one or more merchants associated with the data field.

13. The method of claim 12, further comprising identifying, for each account, a list of merchants that characterize the account.

14. The method of claim 11, further comprising generating each data value with a normalizing process based on numbers of financial transactions associated with the corresponding data field and account.

15. The method of claim 1, further comprising generating key characteristics data by identifying, for each group, a set of merchants that characterize the group.

16. The method of claim 15, wherein the set of merchants includes merchants for whom financial transactions occur at a higher rate within the group of accounts than in all of the accounts on average.

17. The method of claim 16, wherein identifying the set of merchants includes identifying merchants for whom financial transactions occur within the group at a rate higher than a threshold rate.

18. The method of claim 1, wherein the financial management system is a book-keeping system.

19. The method of claim 18, wherein each financial transactions associated with a user is assigned to at least one of the accounts of the user.

20. The method of claim 19, wherein each financial account of a user corresponds to a category of financial transactions.

21. The method of claim 20, wherein each user assigns financial transactions of the user to the accounts associated with the user.

22. The method of claim 20, wherein the financial management system assigns financial transactions of a user to selected accounts of the user based on the merchant identification and the account grouping data.

23. The method of claim 22, further comprising:
receiving new financial transaction data including a new financial transaction of one of the users;
identifying a merchant identification of the new financial transaction;
identifying from the account grouping data a group associated with the merchant identification; and
determining whether the user has an account included in the group of accounts.

24. The method of claim 23, further comprising assigning the new financial transaction to the account of the user included in the group of accounts associated with the merchant identification.

25. The method of claim 23, further comprising generating message data recommending that the user assign the new financial transaction to the account of the user included in the group of accounts associated with the merchant identification.

26. The method of claim 1, wherein performing grouping analysis on the account characteristics vector data includes executing a grouping algorithm.

27. The method of claim 26, wherein the grouping algorithm includes one or more of:
a K-means algorithm;
a DBSCAN algorithm; and
an affinity propagation algorithm.

28. The method of claim 1, wherein one or more of the users are businesses.

29. The method of claim 1, wherein one or more of the users are organizations.

30. The method of claim 1, wherein one or more of the users are individuals.

31. The method of claim 1, wherein the financial transactions data includes financial transactions data gathered from a selected period of time.

* * * * *